(12) United States Patent
Lee et al.

(10) Patent No.: US 8,930,905 B2
(45) Date of Patent: Jan. 6, 2015

(54) SYSTEM AND METHOD FOR PROVIDING A GUIDELINE FOR OPTIMIZING PLATFORM

(71) Applicant: Samsung Electronics Co., Ltd., Suwon-si (KR)

(72) Inventors: Jung-won Lee, Ansan-si (KR); Cheul-hee Hahm, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 13/710,609

(22) Filed: Dec. 11, 2012

(65) Prior Publication Data

US 2014/0165046 A1    Jun. 12, 2014

(30) Foreign Application Priority Data

Mar. 5, 2012  (KR) .................. 10-2012-0022194

(51) Int. Cl.
  *G06F 9/44*      (2006.01)
  *G06F 11/36*     (2006.01)

(52) U.S. Cl.
  CPC ................. *G06F 11/3668* (2013.01)
  USPC ......................................... 717/121

(58) Field of Classification Search
  None
  See application file for complete search history.

(56) References Cited

U.S. PATENT DOCUMENTS

| 6,263,495 | B1 | 7/2001 | Kataoka | |
| 2004/0117779 | A1* | 6/2004 | Lagergren | 717/153 |
| 2006/0235674 | A1* | 10/2006 | Voigt | 703/17 |
| 2007/0192082 | A1* | 8/2007 | Gaos et al. | 703/27 |
| 2008/0228814 | A1* | 9/2008 | Raley et al. | 707/104.1 |
| 2009/0320020 | A1* | 12/2009 | Perrone et al. | 718/1 |
| 2010/0082322 | A1* | 4/2010 | Cherkasova et al. | 703/22 |
| 2010/0083248 | A1* | 4/2010 | Wood et al. | 718/1 |
| 2011/0154285 | A1 | 6/2011 | Kim | |
| 2011/0173605 | A1* | 7/2011 | Bourne | 717/176 |
| 2012/0060167 | A1* | 3/2012 | Salsburg et al. | 718/104 |
| 2013/0047036 | A1* | 2/2013 | Pechanec et al. | 714/38.1 |
| 2013/0191528 | A1* | 7/2013 | Heninger et al. | 709/224 |

FOREIGN PATENT DOCUMENTS

| JP | 11-24907 A | 1/1999 |
| JP | 2007-34650 A | 2/2007 |
| KR | 2002-0021237 A | 3/2002 |
| KR | 10-2006-0028526 A | 3/2006 |
| KR | 10-2007-0058947 A | 6/2007 |
| KR | 10-2011-0037140 A | 4/2011 |
| KR | 10-2011-0071474 A | 6/2011 |
| KR | 10-2011-0080558 A | 7/2011 |

\* cited by examiner

*Primary Examiner* — Don Wong
*Assistant Examiner* — Daxin Wu
(74) *Attorney, Agent, or Firm* — Sughrue Mion, PLLC (57) ABSTRACT

A system and method for providing a guideline for optimizing a platform are provided. The system for providing a guideline for optimizing a platform includes: a virtual hardware platform which virtually simulates a hardware architecture equivalent to hardware and performs a function of the hardware; a software platform which provides an operating environment of software on the virtual hardware platform; an application class which installs and operates software to be inspected on the software platform; a simulation class which simulates the software to be inspected; and an optimization inspection class which inspects whether the software to be inspected is optimized to the hardware platform or the software platform, during the simulation, the optimization inspection class providing an optimization inspection result of the software to be inspected as the guideline for optimizing the platform.

22 Claims, 5 Drawing Sheets

| SOFTWARE TO BE INSPECTED | RECOMMENDATION INFORMATION |
|---|---|
| FUNCTION A; FUNCTION B | FUNCTION B; FUNCTION A |
| FUNCTION C X 10 | FUNCTION C' X 10 |

SYSTEM AND METHOD FOR PROVIDING A GUIDELINE FOR OPTIMIZING PLATFORM

CROSS-REFERENCE TO RELATED APPLICATION

This application claims priority from Korean Patent Application No. 10-2012-0022194, filed on Mar. 5, 2012 in the Korean Intellectual Property Office, the disclosure of which is incorporated herein by reference in its entirety.

BACKGROUND

1. Field

Apparatuses and methods consistent with the exemplary embodiments relate to a system and method for providing a guideline for optimizing a platform, and more particularly to a system and method for providing a guideline for optimizing a platform, which can provide a software development guide in a process of simulating developed software.

2. Description of the Related Art

Software can be used to implement a predetermined function desired by a developer on a certain platform. For efficiency in developing the software, the platform is configured to have a generalized interface. Thus, a software developer can develop software capable of providing similar functions on various platforms through the generalized interface. However, various platforms have respective characteristics, and software developers have to perform optimizing operations adaptive to the respective platforms in order to develop the software capable of providing optimal functions on the respective platforms. A conventional platform provider provides a guideline about a development process needed for allowing a software developer to develop the best results. However, conventionally, such a guideline about the development process is provided as a document, and thus a software developer has to fully know items and contents disclosed in the document so as to meet with the best results. Also, conventionally, a software developer has no method for ascertaining whether the developed software is optimized to the guideline.

SUMMARY

One or more exemplary embodiments may provide a system and method for providing a guideline for optimizing a platform, in which a software developer can determine whether predetermined developed software is optimized to a platform to which the software is applied and provide a recommendation guideline for optimization.

According to an aspect of an exemplary embodiment, there is provided a system for providing a guideline for optimizing a platform, the system including: a virtual hardware platform which virtually simulates a hardware architecture equivalent to predetermined hardware and performs a function of the hardware; a software platform which provides an operating environment of software on the virtual hardware platform; an application class which installs and operates software to be inspected on the software platform; a simulation class which simulates the software to be inspected; and an optimization inspection class which inspects whether the software to be inspected is optimized to the hardware platform or the software platform, during the simulation, the optimization inspection class providing an optimization inspection result of the software to be inspected as the guideline for optimizing the platform.

The optimization inspection result may include a determination of whether the software to be inspected is optimized to the hardware platform or the software platform; and recommendation information for the optimization.

The system may further include inspection database storing at least one from among characteristic information of the hardware platform, first recommendation information for optimizing software based on the characteristic information of the hardware platform, characteristic information of the software platform, and second recommendation information for optimizing software based on the characteristic information of the software platform.

The first recommendation information may include at least one recommendation function information optimized to the characteristic information of the hardware platform with regard to at least one first function constituting the software to be inspected, and the second recommendation information may include at least one recommendation function information optimized to the characteristic information of the software platform with regard to at least one second function constituting the software to be inspected.

The recommendation inspection class may limit execution of the software to be inspected, if the execution of the software to be inspected causes an error in the virtual hardware platform or the software platform.

The optimization inspection class may be provided inside the software platform.

According to an aspect of another exemplary embodiment, there is provided a method of providing a guideline for optimizing a platform in a system for providing the guideline for optimizing the platform, which includes a virtual hardware platform, a software platform, and an application class, the method including: calling and executing the software to be inspected, installed in the application class, for simulation; determining whether the software to be inspected is optimized to at least one of the hardware platform and the software platform during the simulation; and providing an optimization inspection result of the software to be inspected as a guideline for optimizing the platform.

The optimization inspection result may include a determination of whether the software to be inspected is optimized to the at least one of the hardware platform and the software platform; and recommendation information for the optimization.

The method may further include inspection database storing at least one from among characteristic information of the hardware platform, first recommendation information for optimizing software based on the characteristic information of the hardware platform, characteristic information of the software platform, and second recommendation information for optimizing software based on the characteristic information of the software platform.

The first recommendation information may include at least one recommendation function information optimized to the characteristic information of the hardware platform with regard to at least one first function constituting the software to be inspected, and the second recommendation information may include at least one recommendation function information optimized to the characteristic information of the software platform with regard to at least one second function constituting the software to be inspected.

The determining the optimization may include limiting execution of the software to be inspected, if the execution of the software to be inspected causes an error in at least one from among the virtual hardware platform and the software platform.

According to an aspect of an exemplary embodiment, there is provided a system for providing a guideline for optimizing a platform, the system including: a hardware platform; a software platform which provides an operating environment of predetermined software on the hardware platform; an application class which installs and operates software to be inspected on the software platform; and an optimization inspection class which determines whether the software to be inspected is optimized to at least one of the hardware platform and the software platform, when the software to be inspected is executed, the optimization inspection class providing an optimization inspection result of the software to be inspected as the guideline for optimizing the platform.

The optimization inspection result may include a determination of whether the software to be inspected is optimized to the at least one of the hardware platform and the software platform; and recommendation information for the optimization.

The system may further include an inspection database which stores at least one from among characteristic information of the hardware platform, first recommendation information for optimizing predetermined software based on the characteristic information of the hardware platform, characteristic information of the software platform, and second recommendation information for optimizing predetermined software based on the characteristic information of the software platform.

The first recommendation information may include at least one recommendation function information optimized to the characteristic information of the hardware platform with regard to at least one first function constituting the software to be inspected, and the second recommendation information may include at least one recommendation function information optimized to the characteristic information of the software platform with regard to at least one second function constituting the software to be inspected.

The recommendation inspection class may limit execution of the software to be inspected, if the execution of the software to be inspected causes an error in the virtual hardware platform or the software platform.

The optimization inspection class may be provided inside the software platform.

According to an aspect of an exemplary embodiment, there is provided a method of providing a guideline for optimizing a platform in a system for providing the guideline for optimizing the platform, which includes a hardware platform, a software platform, and an application class, the method including: executing the software to be inspected, installed in the application class; determining whether the software to be inspected is optimized to at least one of the hardware platform and the software platform; and providing an optimization inspection result of the software to be inspected as a guideline for optimizing the platform.

The optimization inspection result may include a determination of whether the software to be inspected is optimized to the at least one of the hardware platform and the software platform; and recommendation information for the optimization.

The method may further include storing, at an inspection database, at least one from among characteristic information of the hardware platform, first recommendation information for optimizing software based on the characteristic information of the hardware platform, characteristic information of the software platform, and second recommendation information for optimizing software based on the characteristic information of the software platform.

The first recommendation information may include at least one recommendation function information optimized to the characteristic information of the hardware platform with regard to at least one first function constituting the software to be inspected, and the second recommendation information may include at least one recommendation function information optimized to the characteristic information of the software platform with regard to at least one second function constituting the software to be inspected.

The determining the optimization may include limiting execution of the software to be inspected, if the execution of the software to be inspected causes an error in at least one from among the virtual hardware platform and the software platform.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily understood by a person having ordinary knowledge in the art. Exemplary embodiments may be embodied in various forms without being limited to the exemplary embodiments set forth herein. Descriptions of well-known parts are omitted for clarity, and like reference numerals refer to like elements throughout.

Figure 1:
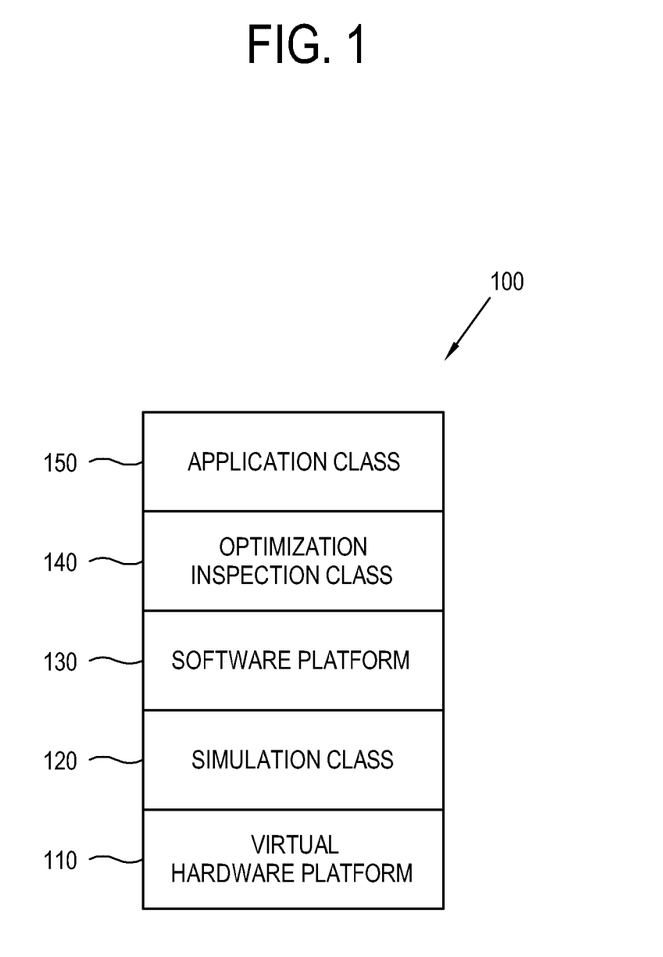
FIG. 1 is a view showing a structure of a system for providing a guideline for optimizing a platform according to an exemplary embodiment.

FIG. 1 is a view showing a structure of a system for providing a guideline for optimizing a platform according to an exemplary embodiment.

Referring to FIG. 1, a system 100 for providing a guideline for optimizing a platform includes a virtual hardware platform 110, a simulation class 120, a software platform 130, an optimization inspection class 140, and an application class 150.

The system 100 for providing the guideline for optimizing the platform can perform a similar function to a platform emulator. Software developed by a software developer can perform simulation on the system for providing the guideline for optimizing the platform according to this exemplary embodiment, and if it is determined while performing the simulation that the developed software is not optimized to the platform, the system 100 outputs a recommendation guideline for optimization, thereby helping a software developer to modify the developed software.

The virtual hardware platform 110 virtually operates as a hardware architecture equivalent to physical hardware of a predetermined electronic device, and performs a function of the hardware. If the electronic device is a display device (a TV or a monitor), the virtual hardware platform 110 may directly materialize operate as a real display device including a receiver for receiving video, a signal processor for processing a video and/or audio signal, a display unit for displaying the processed video, a speaker for outputting the processed audio, a memory for storing predetermined data, a user input unit for receiving input from a user, a controller for controlling operations of these elements. Also, the virtual hardware platform 110 may include a device driver (not shown) for each element so that the virtually implemented hardware can operate almost similarly to the real device. Thus, the virtual hardware platform 110 is obtained by simulating the hardware architecture equivalent of the hardware of a certain electronic device to which software to be developed can be applied.

The simulation class 120 performs simulation of software that a software developer develops and wants to inspect. That is, the simulation class 120 is a class for emulating the software to be inspected. The emulation generally copies and realizes different kinds of hardware or software, so that the existing program can be directly used while minimizing a shock based on conversion from one computer system to another computer system. Thus, even in a personal computer or workstation having an operating structure different from the physical hardware to which the software to be inspected will be applied, the system 100 for providing the guideline for optimizing the platform according to this exemplary embodiment can operate similarly to the physical hardware (electronic device), thereby minimizing a modifying or debugging operation that occurs when the developed platform or software is installed in the real physical hardware thereafter.

The software platform 130 provides an operating environment of predetermined software on the virtual hardware platform. The software platform 130 is a class including an operating system (OS) in which the predetermined software can be operated, a library, and an application framework. Therefore, the software platform 130 provides the operating environment such as the operating system or the like in which the software to be inspected is installed and operated. The kind of the software platform 130 depends on the virtual hardware platform 110. That is, the software platform 130 includes a software platform to be applied to the virtual hardware platform 110.

The application class 150 installs and operates the software to be inspected on the software platform 130.

The optimization inspection class 140 is a class for inspecting whether the software to be inspected is optimized to the hardware platform or the software platform, during the simulation process, thereby providing an optimization inspection result of the software to be inspected as a guideline for optimizing the platform.

The optimization inspection class 140 inspects whether the software to be inspected is optimized while simulating the software to be inspected on the simulation class, and provides the optimization inspection results. In this exemplary embodiment, the optimization is a concept including whether the software to be inspected is well executed on the hardware platform or software platform, and/or whether the software to be inspected has high efficiency on the hardware platform or software platform (or the software to be inspected shows good performance) when the software is well executed. Therefore, if the software to be inspected is well executed but the efficiency of the execution is bad (or the software to be inspected shows bad performance), it is determined that the software to be inspected is not optimized on the hardware platform or software platform.

The optimization inspection results include whether the software to be inspected is optimized on the hardware platform or software platform, and include recommendation information for the optimization.

The optimization inspection class 140 includes an inspection database (not shown) storing at least one of characteristic information of the hardware platform, first recommendation information for optimizing predetermined software on the basis of the characteristic information of the hardware platform, characteristic information of the software platform, and second recommendation information for optimizing predetermined software on the basis of the characteristic information of the software platform.

The characteristic information of the hardware platform and the first recommendation information are provided by the hardware platform provider, which can perform the same function as a software developer guide. The characteristic information of the hardware platform includes information about distinctive characteristic of the hardware platform. The first recommendation information includes recommendation function information about transgressive function information of a software developer when she/he develops the software for the hardware platform. That is, the first recommendation information includes at least one first recommendation function information optimized to the characteristic information of the hardware platform with regard to at least one first function constituting the software to be inspected. The first function may allow the software to be inspected to not work well on the hardware platform or may include a function of deteriorating the performance of the software to be inspected even though the software to be inspected does work well on the hardware platform. Therefore, the first recommendation function information recommends the function information to be used instead of the first function.

The characteristic information of the software platform and the second recommendation information are provided by a software platform provider, which can perform the same function as a software developer guide. The characteristic information of the software platform includes information about distinctive characteristic of the software platform. Like the first recommendation information, the second recommendation information includes recommendation function information about transgressive function information of a software developer when she/he develops the software for the software platform.

Thus, the optimization inspection class 140 inspects whether the software to be inspected is optimized on the basis of the characteristic information of the hardware platform or the characteristic information of the software platform of the inspection database. If it is determined that the software to be inspected is not optimized, the optimization inspection class 140 may provide the first recommendation information about the first function or the second recommendation information about the second function included in the software to be inspected on the basis of the first recommendation information or the second recommendation information. Therefore, the software developer can determine the optimized degree of the software to be inspected through the optimization inspection of the optimization inspection class 140, and improve the software to have a function code more optimized to the hardware platform or the software platform with reference to the first recommendation information or the second recommendation information.

Also, the recommendation inspection class 140 may limit the execution of the software to be inspected, if the execution of the software to be inspected causes an error in the virtual hardware platform or the software platform. The recommendation inspection class 140 may limit the execution of the software to be inspected if it is determined that the execution of the software to be inspected causes trouble in the whole reliability of the hardware platform or the software platform or causes malfunction in other software. That is, the execution itself of the software to be inspected is caused to stop. If development flexibility is increased when the platform is substantially developed, various functions can be advantageously achieved, but a fatal error may occur in the platform according to the software to be developed. If the flexibility of the platform is limited, the platform is stabilized, but it is difficult to achieve various functions. Accordingly, to overcome such shortcomings, the optimization inspection class 140 of the system in this exemplary embodiment may provide a minimum limit to function achievement of the software while securing the flexibility of the platform.

Also, the optimization inspection class 140 may exist in a higher rank than the software platform 130, or be provided inside the software platform 130.

Figure 2:
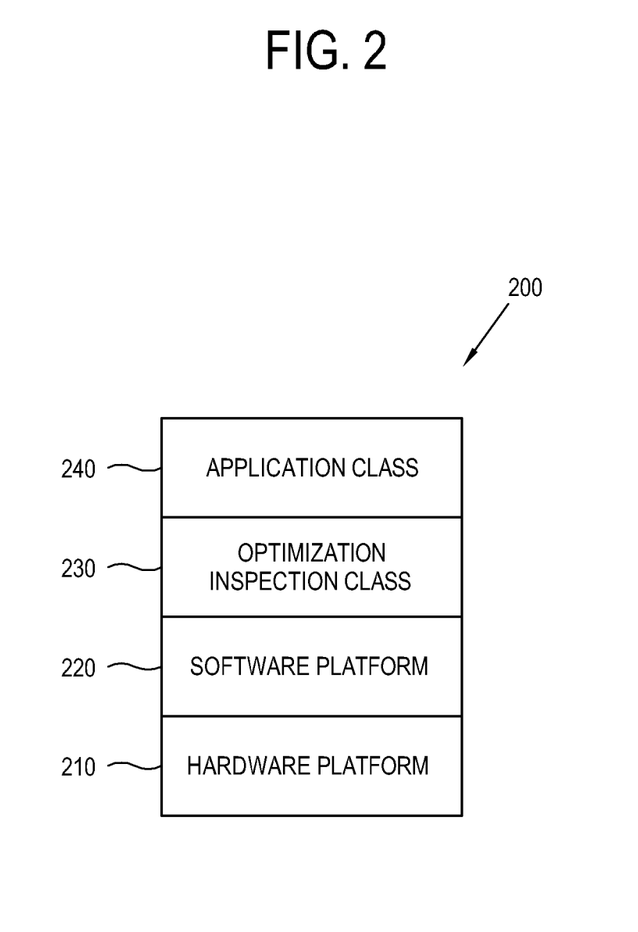
FIG. 2 is a view showing a structure of a system for providing a guideline for optimizing a platform according to another exemplary embodiment.

FIG. 2 is a view showing a structure of a system for providing a guideline for optimizing a platform according to another exemplary embodiment. Referring to FIG. 2, the system 200 for providing the guideline for optimizing the platform includes a hardware platform 210, a software platform 220, an optimization inspection class 230 and an application class 240. While FIG. 1 is related to the system capable of inspecting the optimization of the software in the emulation process for inspecting the performance of the software when the software is developed, FIG. 2 is related to the system capable of inspecting the optimization of the software in a process of installing and executing the developed software in the software platform on the real hardware platform (or physical hardware or an electronic device). Therefore, FIG. 1 shows the virtual hardware platform, but FIG. 2 shows the hardware platform of a certain electronic device in which the software to be inspected will be executed. Further, FIG. 1 shows the simulation class, but FIG. 2 does not show the simulation class.

Referring to FIG. 2, the software once inspected through the system of FIG. 1 is executed in the real electronic device, and then it is inspected once again to determine whether the software to be inspected is actually optimized to the hardware platform 210 or the software platform 220. The elements of FIG. 2 perform the same/similar functions as those of FIG. 1, and thus repetitive descriptions thereof will be avoided.

The optimization inspection class 230 inspects whether execution of predetermined software is optimized to the hardware platform 210 or the software platform 220, and provides an optimization inspection result to a software developer. The optimization inspection class 230 may exist in a higher rank than the software platform 220, or be provided inside the software platform 220. The optimization inspection class 230 performs the same/similar operation as the optimization inspection class 140 of FIG. 1, and thus repetitive descriptions thereof will be avoided.

Figure 3:
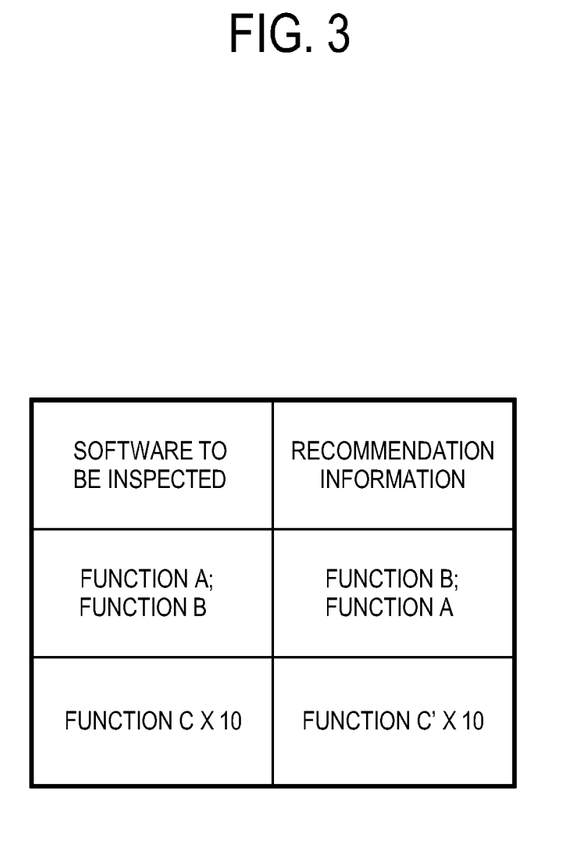
FIG. 3 is a view showing an exemplary embodiment of recommendation information provided in the systems of FIGS. 1 and 2.

FIG. 3 is a view showing an exemplary embodiment of recommendation information provided in the systems of FIGS. 1 and 2.

The optimization inspection class 140, 230 inspects whether the software to be inspected is optimized to the hardware platform 110, 210 or the software platform 130, 220.

If the software to be inspected is not optimized to the hardware platform or the software platform, the recommendation information may be provided as shown in the table of FIG. 3.

Referring to FIG. 3, an original function code of the software to be inspected is executing a function B after executing a function A. However, as an optimization inspection result of the optimization inspection class, if it is determined that the software to be inspected is advantageous in performance of the software when the function A is executed after executing the function B on the corresponding hardware platform or software platform, this may be given as the recommendation information.

Also, an original function code of the software to be inspected is repetitively executing a function C ten times. However, as an optimization inspection result of the optimization inspection class, if it is determined that the software to be inspected is advantageous in performance of the software when a function C is repetitively executed ten times on the corresponding hardware platform or software platform, this may be given as the recommendation information.

The optimization inspection class 140, 230 of the system in this exemplary embodiment inspects not only an error in the software to be inspected but also optimization of the software on the hardware platform 110, 210 or the software platform 130, 220, and provides the recommendation information for the optimization (or for improving the performance of the software) as the result of the inspection, thereby allowing a software developer to easily develop software optimized to the corresponding platform.

As described above, the optimization inspection class 140, 230 of the system in this exemplary embodiment inspects the optimization of the software to be inspected by referring to the characteristic information of the hardware platform or the characteristic information of the software platform. Therefore, if the software platforms are the same but the hardware platforms are different, the optimization inspection class 140, 230 determines the optimization corresponding to the characteristic of each hardware platform and then provides corresponding recommendation information.

The system 100, 200 for providing the guideline for optimizing the platform according to an exemplary embodiment does not simply provide error information when the software to be inspected is executed on the hardware platform or the software platform, but determines whether the software to be inspected can exhibit the best performance on the platform on the basis of the hardware platform characteristic and the software platform characteristic (i.e., optimization) as well as the error information, and provides a software developer the recommendation information containing information for exhibiting the best performance. Thus, using the system in this exemplary embodiment, a software developer can personally ascertain whether the developed software can exhibit the best performance on the platform, and develop the software optimized to the corresponding platform by reflecting the recommendation information on the software.

Figure 4:
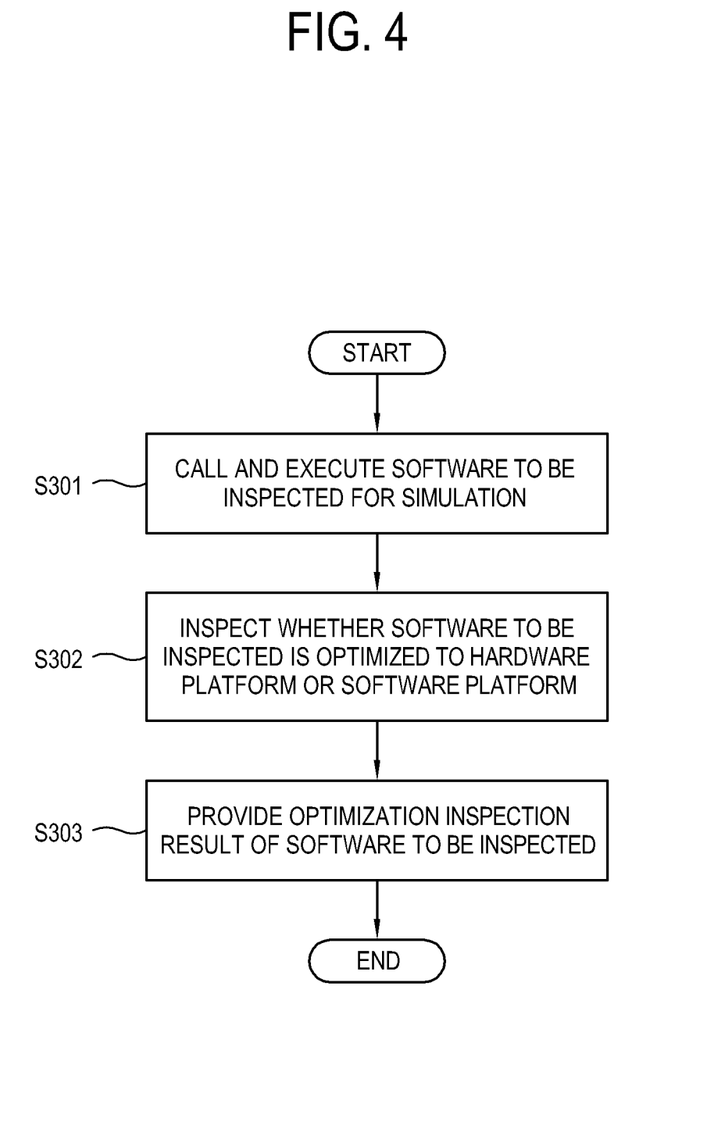
FIG. 4 is a flowchart of a method for providing a guideline in the system for providing the guideline for optimizing the platform in FIG. 1.

FIG. 4 is a flowchart of a method for providing a guideline in the system for providing the guideline for optimizing the platform in FIG. 1.

The system 100 for providing the guideline for optimizing the platform includes the virtual hardware platform 110, the simulation class 120, the software platform 130, the optimization inspection class 140, and the application class 150. In the method for providing the guideline for optimizing the platform, the simulation class 120 of the system 100 calls and executes the software developed by a software developer at operation S301. During the simulation process, the optimization inspection class 140 inspects whether the execution of the software to be inspected is optimized to the hardware platform 110 or the software platform 130. At operation S302, the optimization inspection class 140 uses the first recommendation information/second recommendation information about optimization of predetermined software based on hardware platform/characteristic information of the hardware platform and the software platform/characteristic information of the software platform stored in the inspection database (not shown) when the optimization is inspected.

Further, at operation S303, the optimization inspection class 140 provides an optimization inspection result of the software to be inspected as a guideline for optimizing the platform.

Figure 5:
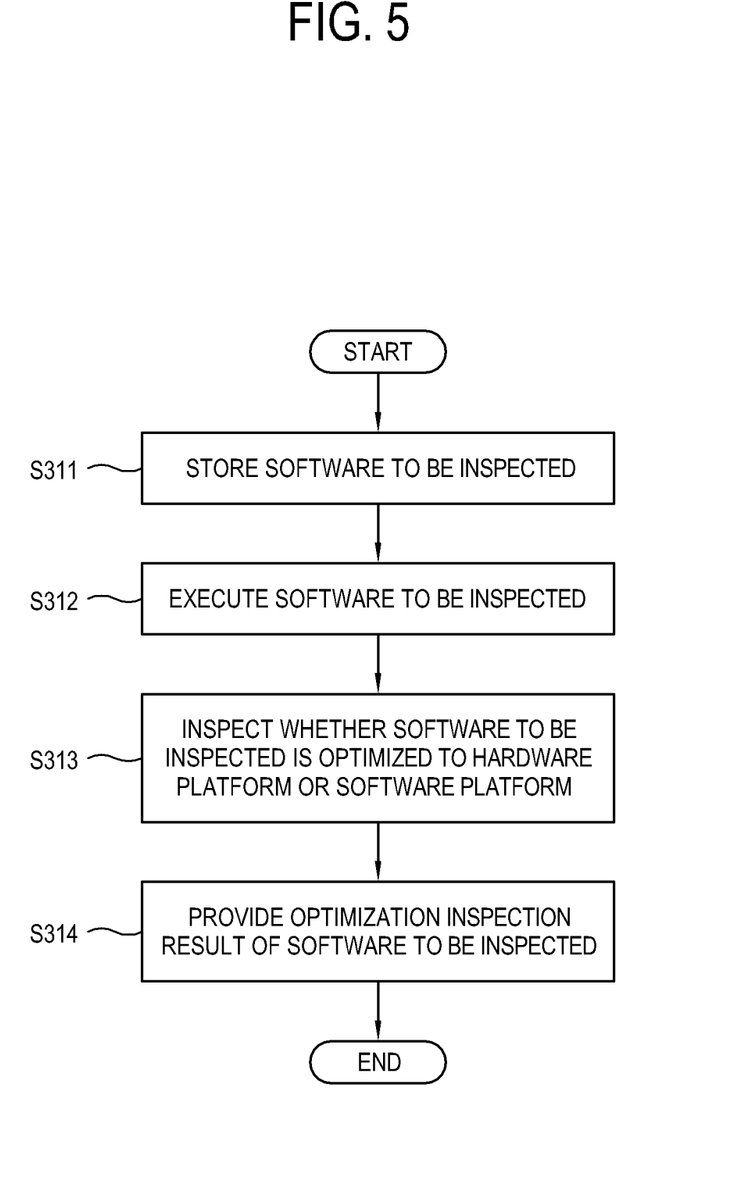
FIG. 5 is a flowchart of a method for providing a guideline in the system for providing the guideline for optimizing the platform in FIG. 2.

FIG. 5 is a flowchart of a method for providing a guideline in the system for providing the guideline for optimizing the platform in FIG. 2.

The system 200 for providing the guideline for optimizing the platform includes the hardware platform 210, the software platform 220, the optimization inspection class 230, and the application class 240. In the method for providing the guideline for optimizing the platform, the software developed by a software developer is stored in the application class 240 at operation S311. When the software to be inspected is executed at operation S312, the optimization inspection class 230 inspects whether the execution of the software to be inspected is optimized to the hardware platform 210 or the software platform 220 at operation S313. At this time, the optimization inspection class 230 uses the first recommendation information/second recommendation information about optimization of predetermined software based on hardware platform/characteristic information of the hardware platform and the software platform/characteristic information of the software platform stored in the inspection database (not shown) when the optimization is inspected.

Further, at operation S314 the optimization inspection class 230 provides an optimization inspection result of the software to be inspected as a guideline for optimizing the platform.

As described above, a system and method for providing a guideline for optimizing a platform, in which a software developer can discover whether predetermined developed software is optimized to a platform to which the software is applied and provide a recommendation guideline for optimization.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A system for providing a guideline for optimizing a hardware platform or a software platform, the system comprising:
    a virtual hardware platform which virtually simulates a hardware architecture equivalent to hardware and performs a function of the hardware, and comprises a hardware processor and a memory;
    a software platform which provides an operating environment of software on the virtual hardware platform;
    an application class which installs and operates software to be inspected on the software platform;
    an inspection database which stores at least one from among characteristic information of the hardware platform and characteristic information of the software platform;
    a simulation class which simulates the software to be inspected; and
    an optimization inspection class which inspects whether the software to be inspected is optimized to the hardware platform or the software platform, based on the characteristic information of the hardware platform or the characteristic information of the software platform stored in the inspection database, and
    provides an optimization inspection result of the software to be inspected as a guideline for optimizing the hardware platform or the software platform.

2. The system according to claim 1, wherein the optimization inspection result comprises a determination of whether the software to be inspected is optimized to the hardware platform or the software platform; and recommendation information for the optimization.

3. The system according to claim 2, wherein the inspection database further stores at least one from among first recommendation information for optimizing software based on the characteristic information of the hardware platform and second recommendation information for optimizing software based on the characteristic information of the software platform.

4. The system according to claim 3, wherein the first recommendation information comprises at least one recommendation function information optimized to the characteristic information of the hardware platform with regard to at least one first function constituting the software to be inspected, and
    the second recommendation information comprises at least one recommendation function information optimized to the characteristic information of the software platform with regard to at least one second function constituting the software to be inspected.

5. The system according to claim 2, wherein the recommendation inspection class limits execution of the software to be inspected, if the execution of the software to be inspected causes an error in the virtual hardware platform or the software platform.

6. The system according to claim 1, wherein the optimization inspection class is provided inside the software platform.

7. A method of providing a guideline for optimizing a hardware platform or a software platform in a system for providing the guideline for optimizing the hardware platform or the software platform, which comprises a virtual hardware platform, a software platform, and an application class, the method comprising:
    calling and executing the software to be inspected, installed in the application class, for simulation;
    storing at least one from among characteristic information of the hardware platform and characteristic information of the software platform;
    determining whether the software to be inspected is optimized to the hardware platform or the software platform during the simulation, based on the characteristic information of the hardware platform or the characteristic information of the software platform; and
    providing an optimization inspection result of the software to be inspected as a guideline for optimizing the hardware platform or the software platform.

8. The method according to claim 7, wherein the optimization inspection result comprises a determination of whether the software to be inspected is optimized to the hardware platform or the software platform; and recommendation information for the optimization.

9. The method according to claim 8, further comprising storing, at an inspection database, at least one from among first recommendation information for optimizing software based on the characteristic information of the hardware platform and second recommendation information for optimizing software based on the characteristic information of the software platform.

10. The method according to claim 9, wherein the first recommendation information comprises at least one recommendation function information optimized to the characteristic information of the hardware platform with regard to at least one first function constituting the software to be inspected, and the second recommendation information comprises at least one recommendation function information optimized to the characteristic information of the software platform with regard to at least one second function constituting the software to be inspected.

11. The method according to claim 10, wherein the determining the optimization comprises limiting execution of the software to be inspected, if the execution of the software to be inspected causes an error in at least one of the virtual hardware platform and the software platform.

12. A system for providing a guideline for optimizing a hardware platform or a software platform, the system comprising:

a hardware platform;

a software platform which provides an operating environment of software on the hardware platform;

an application class which installs and operates software to be inspected on the software platform;

an inspection database which stores at least one from among characteristic information of the hardware platform and characteristic information of the software platform; and an optimization inspection class which determines whether the software to be inspected is optimized to the hardware platform or the software platform based on the characteristic information of the hardware platform or the characteristic information of the software platform stored in the inspection database, when the software to be inspected is executed, the optimization inspection class providing an optimization inspection result of the software to be inspected as a guideline for optimizing the hardware platform or the software platform.

13. The system according to claim 12, wherein the optimization inspection result comprises a determination of whether the software to be inspected is optimized to the hardware platform or the software platform; and recommendation information for the optimization.

14. The system according to claim 13, further comprising an inspection database which stores the at least one from among characteristic information of the hardware platform, first recommendation information for optimizing software based on the characteristic information of the hardware platform, the characteristic information of the software platform, and second recommendation information for optimizing software based on the characteristic information of the software platform.

15. The system according to claim 14, wherein the first recommendation information comprises at least one recommendation function information optimized to the characteristic information of the hardware platform with regard to at least one first function constituting the software to be inspected, and the second recommendation information comprises at least one recommendation function information optimized to the characteristic information of the software platform with regard to at least one second function constituting the software to be inspected.

16. The system according to claim 15, wherein the recommendation inspection class limits execution of the software to be inspected, if the execution of the software to be inspected causes an error in the virtual hardware platform or the software platform.

17. The system according to claim 12, wherein the optimization inspection class is provided inside the software platform.

18. A method of providing a guideline for optimizing a hardware platform or a software platform in a system for providing the guideline for optimizing the hardware platform or the software platform, the system comprising the hardware platform, the software platform, and an application class, and the method comprising:

executing the software to be inspected, installed in the application class;

storing at least one from among characteristic information of the hardware platform and characteristic information of the software platform;

determining whether the software to be inspected is optimized to the hardware platform or the software platform, based on the characteristic information of the hardware platform and the characteristic information of the software platform; and providing an optimization inspection result of the software to be inspected as a guideline for optimizing the hardware platform or the software platform.

19. The method according to claim 18, wherein the optimization inspection result comprises a determination of whether the software to be inspected is optimized to the hardware platform or the software platform; and recommendation information for the optimization.

20. The method according to claim 19, further comprising storing, at an inspection database, the at least one from among characteristic information of the hardware platform, first recommendation information for optimizing software based on the characteristic information of the hardware platform, the characteristic information of the software platform, and second recommendation information for optimizing software based on the characteristic information of the software platform.

21. The method according to claim 20, wherein the first recommendation information comprises at least one recommendation function information optimized to the characteristic information of the hardware platform with regard to at least one first function constituting the software to be inspected, and the second recommendation information comprises at least one recommendation function information optimized to the characteristic information of the software platform with regard to at least one second function constituting the software to be inspected.

22. The method according to claim 21, wherein the determining the optimization comprises limiting execution of the software to be inspected, if the execution of the software to be inspected causes an error in at least one from among the virtual hardware platform and the software platform.

* * * * *